United States Patent

Dirkin et al.

[11] Patent Number: 4,717,035
[45] Date of Patent: Jan. 5, 1988

[54] END CLOSURE FOR COMPOSITE PRESSURE VESSELS

[75] Inventors: William Dirkin; Charles Lund, both of Portage, Mich.

[73] Assignee: Pneumo Abex Corporation, Boston, Mass.

[21] Appl. No.: 935,745

[22] Filed: Nov. 28, 1986

[51] Int. Cl.$^4$ ............................................. B65D 7/44
[52] U.S. Cl. ............................................................. 220/3
[58] Field of Search ................. 220/3, 67, 71, 315, 220/324; 292/253; 242/159, 170

[56] References Cited

U.S. PATENT DOCUMENTS

| | | | |
|---|---|---|---|
| 2,109,529 | 3/1938 | Goddard | 220/3 X |
| 3,079,038 | 2/1963 | Rossi et al. | 220/83 |
| 3,282,757 | 11/1966 | Brussee | 220/3 X |
| 3,293,860 | 12/1966 | Stedfeld | 60/263 |
| 3,303,079 | 2/1967 | Carter | 220/3 X |
| 3,866,792 | 2/1975 | Minke | 220/72 |
| 4,053,080 | 10/1977 | Daublebsky | 220/3 |
| 4,438,858 | 3/1984 | Grover | 220/3 |

Primary Examiner—Steven M. Pollard
Attorney, Agent, or Firm—Renner, Otto, Boisselle & Lyon

[57] ABSTRACT

A composite pressure vessel includes retaining rings at opposite ends of a side wall structure having circumferentially spaced oppositely facing tabs thereon about which longitudinal tension windings are progressively wrapped back and forth in a continuous manner around the circumference of the vessel. Between the tabs at opposite ends of the vessel are oppositely tapered ramp surfaces providing a transition for the longitudinal tension windings from a first diameter axially inwardly of the retaining rings to a second, smaller diameter adjacent the axial outer ends of the tabs, which places the retaining rings in compression in a circumferential direction. Each of the retaining rings has a generally cylindrical support surface adjacent the axial outer ends of the tabs for supporting the generally circumferential extending portions of the longitudinal tension windings thereon. The tabs have sides which taper toward each other in the direction of the axial outer ends of the tabs. Also, the radial outer surfaces of the tabs taper outwardly in the direction of the axial outer ends of the tabs, and such axial outer ends are rounded and extend generally radially and axially inwardly toward the respective ends of the vessel.

17 Claims, 5 Drawing Figures

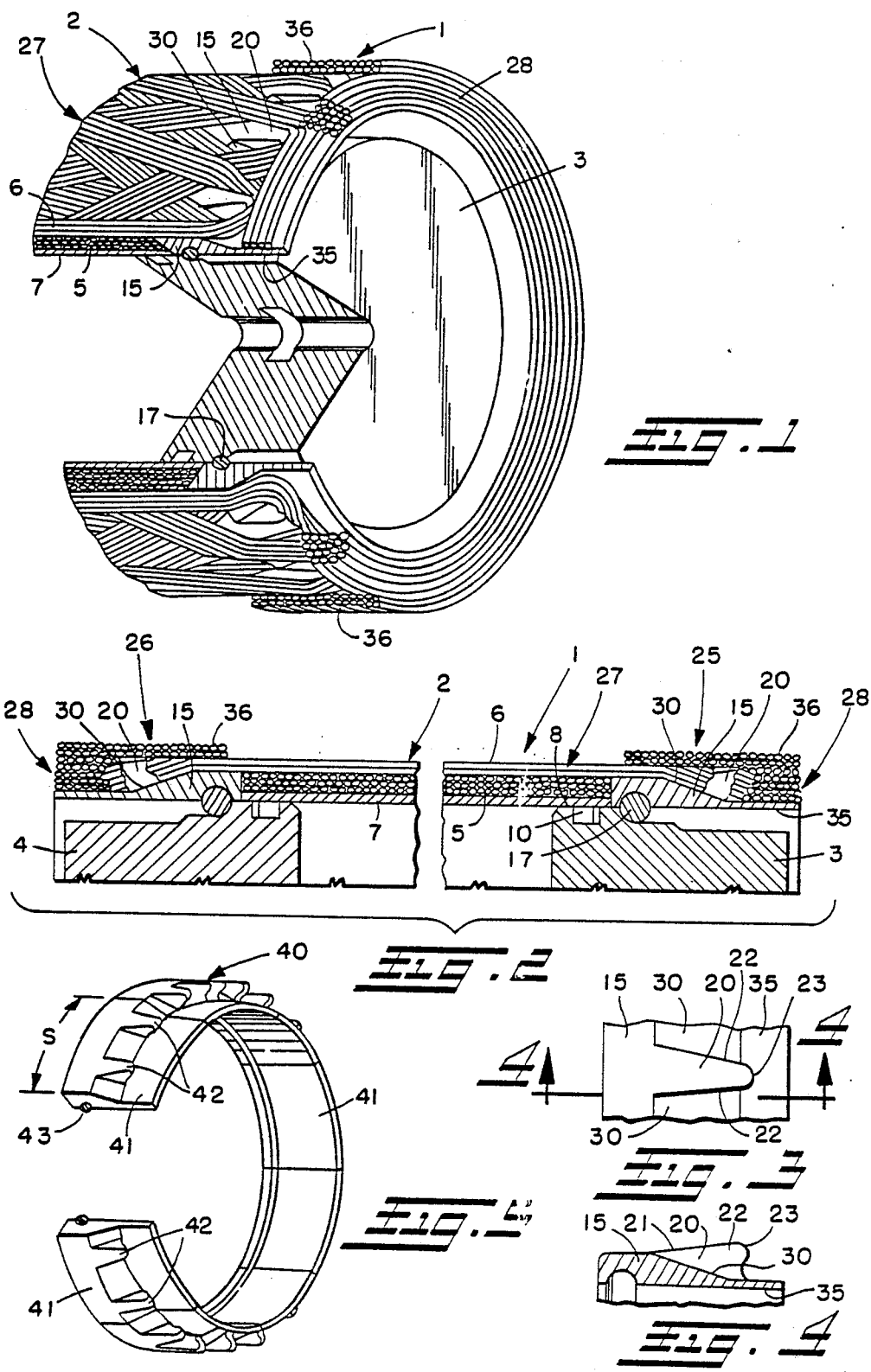

END CLOSURE FOR COMPOSITE PRESSURE VESSELS

BACKGROUND OF THE INVENTION

This invention relates generally as indicated to an end closure for composite pressure vessels which provides for the effective transfer of reaction loads between the end closure and composite side wall structure.

Pressure vessels such as used, for example, in fluid actuators for flight controls for aircraft and other high pressure applications may be constructed of composite fiber materials to reduce the weight of the vessels without sacrificing strength. In such pressure vessels, provision must be made for transferring loads that are introduced at the end closures therefor to the load reacting longitudinal fibers of the composite side wall structure. Heretofore, this has been accomplished in various ways such as by adhesively connecting the longitudinal fibers to the end closures, by providing pins on the end closures about which the longitudinal fibers are wrapped, or by providing an interfering ramped surface on the end closures engaged by the ends of the longitudinal fibers and interspersing hoop windings within and around the longitudinal fibers radially outwardly of the ramped surface. Each of these methods may cause difficulties due to the relative inefficiency of the resulting joints. The use of a ramped surface is relatively efficient but does not allow for the transfer of torsional loads from the end closure to the load reacting longitudinal tension fibers.

SUMMARY OF THE INVENTION

With the foregoing in mind, it is a principal object of this invention to provide a more structurally efficient connection for transferring axial loads between the end closure and side wall structure of a composite pressure vessel.

Another object is to provide for the transfer of torsional loads as well as axial loads through such connection.

In accordance with one aspect of the invention, the longitudinal fibers of the side wall structure are connected to the composite pressure vessel closure by wrapping the fibers around radiused piers or tabs on a retaining ring on the end closure to change the fiber direction from longitudinal to circumferential at such connection joint.

In accordance with another aspect of the invention, ramped surfaces are desirably provided between the retainer ring tabs for engagement by the longitudinal fibers passing between the tabs to provide a transition between a larger dimeter longitudinal fiber area axially inwardly of the retaining ring and a smaller diameter hoop fiber supporting surface area at the connecting joint adjacent the axial outer ends of the tabs to provide a radially inwardly acting load on the retaining ring which causes the retaining ring to be in compression in a circumferential direction.

In accordance with yet another aspect of the invention, hoop fibers may be wrapped around the longitudinal fibers at the connecting joint to provide for increased stability at the connecting joint.

In accordance with still another aspect of the invention, the retaining ring may either be continuous or composed of a plurality of individual segments each fitted on a retainer wire and retained together by the longitudinal fibers wrapped thereabout.

To the accomplishment of the foregoing and related ends, the invention, then, comprises the features hereafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic illustration of one end of a preferred form of composite pressure vessel in accordance with this invention, with portions broken away to show the manner in which the longitudinal fibers of the side wall structure are connected to the end closure at one end of the pressure vessel;

FIG. 2 is an enlarged fragmentary longitudinal section through the end closures and retaining rings at opposite ends of the pressure vessel of FIG. 1;

FIG. 3 is a fragmentary longitudinal section through the retaining ring of FIG. 1;

FIG. 4 is a fragmentary top plan view of such retaining ring; and

FIG. 5 is a perspective view, partially broken away, showing a modified form of retaining ring for use with the pressure vessel of FIGS. 1 and 2.

DETAILED DESCRIPTION OF THE PREFERRED EMBODIMENTS

Referring now in detail to the drawings, and initially to FIGS. 1 and 2, there is schematically shown a preferred form of composite pressure vessel 1 in accordance with this invention including a side wall structure 2 made of fabric reinforced composite materials and end closures 3, 4 at opposite ends thereof. Such a pressure vessel may be used, for example, in fluid actuators for flight controls for aircraft and in other high pressure applications. The pressure vessel side wall structure 2 is desirably constructed of a plurality of layers of relatively high strength to weight circumferential or hoop stress windings 5 and generally longitudinal but somewhat angularly biased tension windings 6 made of a suitable composite fiber such as a high modulus graphite filament wound fiber impregnated with a suitable resin such as epoxy, polyester, polimide, etc.

The inner diameter (I.D.) of the side wall structure 2 may be lined with an impermeable inner barrier liner member 7 as shown to prevent fluid seepage through the relatively porous composite windings 5, 6 of the pressure vessel side wall. Such liner member may be fabricated from metal or organic materials, and may or may not be bonded to the I.D. of the side wall structure as desired.

The end closures 3, 4 at opposite ends of the pressure vessel side wall 2 each include an outer cylindrical surface 8 which is desirably partially surrounded by the inner liner member 7 and the hoop windings 5, with suitable seals 10 disposed between the outer diameter (O.D.) of the end closures and I.D. of the inner liner member 7 to prevent fluid leakage therepast.

To provide for the efficient transfer of axial loads between the end closures 3, 4 and the side wall structure 2 in accordance with the present invention, retaining rings 15 are connected to the respective end closures 3, 4 at opposite ends of the composite pressure vessel 1 in any suitable manner, for example, by providing threaded connections, or by providing retaining wires 17 therebetween as shown in FIGS. 1 and 2. The retaining wires 17 may be retained in place on the end closures in any suitable manner, as by providing removable end plates (not shown) on the outer ends of the end closures. Such annular retaining rings extend radially outwardly beyond the adjacent ends of the liner member 7 and have a plurality of circumferentially spaced axially extending piers or tabs 20 on the O.D. thereof.

Preferably, the tabs 20 extend generally axially outwardly relative to the ends of the vessel, with a slight outward taper along the radial outer edges 21 thereof as shown in FIGS. 3 and 4. Also, the sides 22 of the tabs are desirably slightly tapered toward each other in the direction of the axial outer ends 23 of the tabs which are generally rounded and have a backward slope as further shown in FIGS. 3 and 4 to facilitate wrapping of the longitudinal fibers 6 around the tabs in order to change the generally longitudinal but somewhat biased direction of the longitudinal fibers to circumferential at the connecting joints 25, 26 between the longitudinal fibers and end closures 3, 4.

The longitudinal fibers 6 are progressively wrapped back and forth around the tabs 20 at opposite ends of the vessel in a continuous manner around the circumference of the vessel to provide plural layers of longitudinal fibers each including a generally longitudinal fiber area 27 in which the longitudinal fibers extend substantially the full length of the pressure vessel and a hoop fiber area 28 in which the longitudinal fibers extend in a generally circumferential direction around one or more tabs at opposite ends of the pressure vessel. In a typical installation, the longitudinal fibers may extend in a circumferential direction past several of the tabs at each end of the vessel to traverse a circumferential distance, for example, of approximately 120 degrees before extending back to the other end and vice versa.

Between the tabs 20 are tapered ramp surfaces 30 along which the longitudinal fibers are laid as they pass between the tabs at opposite ends of the vessel. As clearly shown in FIG. 2-4, the retaining rings 15 at opposite ends of the vessel face in opposite directions, whereby the tapers of the respective ramp surfaces extend in opposite directions away from each other to provide a transition between the larger diameter longitudinal fiber area 27 axially inwardly of the retaining rings 15 and a smaller diameter cylindrical hoop fiber supporting surface area 35 on the retaining rings adjacent the axial outer ends of the tabs to produce a radially inwardly acting load on the retaining rings which causes the retaining rings to be in compression in a circumferential direction. This not only forms a more structurally efficient connection for transferring axial loads between the end closures 3, 4 and composite side wall structure 2, but also provides for the transfer of torsional loads therebetween. Additional hoop fibers 36 may also be wrapped around the longitudinal fibers 6 over substantially the entire axial length of the retaining rings 15 including the length of the tabs 20 and ramp surfaces 30 therebetween and hoop fiber area 35, to provide increased stability at the connecting joints 25, 26 between the end closures 3, 4 and side wall structure 2.

In the preferred embodiment shown in FIGS. 1 through 4, the retaining rings 15 are continuous throughout their circumferential extent. However, if desired, the retaining rings 40 may be composed of a plurality of individual ring segments 41 each having a plurality of tabs 42 thereon as shown in FIG. 5. The individual ring segments 41 are sized to provide a close fit therebetween when fitted together around a retaining wire 43 and the longitudinal fibers 6 are wrapped around the tabs 42 to compress the retaining wire into a groove in the I.D. of the retaining ring segments. Otherwise, the details of construction of the retaining ring shown in FIG. 5 is substantially the same as that previously described.

Although the invention has been shown and described with respect to certain embodiments, it is obvious that equivalent alterations and modifications will occur to others skilled in the art upon the reading and understanding of the specification. The present invention includes all such equivalent alterations and modifications and is limited only by the scope of the claims.

What is claimed is:

1. A composite pressure vessel comprising a side wall structure of composite material and end closures at opposite ends of said side wall structure, said side wall structure including generally longitudinal tension windings extending back and forth between opposite ends of said side wall structure, and connecting means for transferring axial loads between said end closures and said longitudinal tension windings, said connecting means including a retaining ring on at least one of said end closures, said retaining ring having a generally cylindrical outer surface, a plurality of circumferentially spaced tabs extending axially outwardly from said outer surface, said tabs having axial outer ends extending generally radially inwardly of said outer surface, and ramp surfaces between said tabs for providing a transition for said longitudinal tension windings from said outer surface to said axial outer ends of said tabs, said longitudinal tension windings including portions laying on said ramp surfaces and extending in a generally circumferential direction around the axial outer ends of a plurality of said tabs radially inwardly of said outer surface for imposing a circumferential compression force to said retaining ring.

2. The composite pressure vessel of claim 1 further comprising a generally cylindrical support surface adjacent the radial innermost portions of the axial outer ends of said tabs for supporting the generally circumferentially extending portions of said longitudinal tension windings extending around the axial outer ends of said tabs.

3. The composite pressure vessel of claim 1 wherein the axial outer ends of said tabs are generally rounded and the sides of said tabs taper toward each other in the direction of said axial outer ends.

4. The composite pressure vessel of claim 1 wherein said tabs have radial outer surfaces that have a slight outward taper in the direction of said axial outer ends of said tabs.

5. The composite pressure vessel of claim 1 wherein the axial outer ends of said tabs have a backward slope.

6. The composite pressure vessel of claim 1 further comprising circumferential hoop stress windings surrounding said longitudinal tension windings over substantially the entire length of said retaining ring.

7. The composite pressure vessel of claim 1 wherein said retaining ring is continuous throughout its circumferential extent.

8. The composite pressure vessel of claim 1 wherein said retaining ring comprises a plurality of circumferential ring segments each having a plurality of said tabs thereon.

9. The composite pressure vessel of claim 1 wherein portions of said longitudinal tension windings extend in a generally circumferential direction approximately 120° around the axial outer ends of said plurality of said tabs.

10. A composite pressure vessel comprising a side wall structure of composite material, end closures at opposite ends of said side wall structure, retaining rings surrounding said end closures, said retaining rings having a plurality of circumferentially spaced tabs thereon extending generally axially outwardly from the respective retaining rings, generally longitudinal tension windings progressively wrapped back and forth around said tabs at opposite ends of said side wall structure in a continuous manner around the circumference of said vessel, said longitudinal tension windings extending in a generally circumferential direction around a plurality of said tabs at opposite ends of said vessel, said tabs having axial outer ends which extend generally radially inwardly of said side wall structure, and oppositely outwardly tapering ramp surfaces between said tabs at opposite ends of said vessel providing a transition for said longitudinal tension windings from a first diameter axially inwardly of said retaining rings to a second smaller diameter adjacent the axial outer ends of said tabs which places said retaining rings in compression in a circumferential direction.

11. The composite pressure vessel of claim 10 wherein said tabs have generally rounded axial outer ends and sides which taper toward each other in the direction of said axial outer ends at opposite ends of said vessel.

12. The composite pressure vessel of claim 11 wherein said tabs have radial outer surfaces which taper outwardly in the direction of said axial outer ends of said tabs.

13. The composite pressure vessel of claim 11 wherein the axial outer ends of said tabs extend generally radially and axially inwardly toward the respective end closures.

14. The composite pressure vessel of claim 10 further comprising a generally cylindrical support surface adjacent the axial outer ends of the respective tabs having an outer diameter substantially corresponding to said second smaller diameter for supporting the generally circumferentially extending portions of said longitudinal tension windings on said support surface, and circumferential hoop stress windings surrounding said longitudinal tension windings over substantially the entire length of each of said retaining rings.

15. The composite pressure vessel of claim 10 wherein each of said retaining rings is continuous throughout its circumferential extent.

16. The composite pressure vessel of claim 10 wherein each of said retainng rings comprises a plurality of individual ring segments each having a plurality of said tabs thereon.

17. The composite pressure vessel of claim 10 wherein said longitudinal tension windings extend in a generally circumferential direction approximately 120° around said tabs at one end of said vessel before extending back to the other end of said vessel and vice versa.

* * * * *